ALUMINUM PURIFICATION SYSTEM

Filed Aug. 31, 1964

INVENTOR
HUBERT MARTIN

BY Glenn, Palmer & Matthews
ATTORNEYS

United States Patent Office 3,301,666
Patented Jan. 31, 1967

3,301,666
ALUMINUM PURIFICATION SYSTEM

Hubert Martin, Chesterfield County, Va., assignor to Reynolds Metals Company, Richmond, Va., a corporation of Delaware Filed Aug. 31, 1964, Ser. No. 393,016
12 Claims. (Cl. 75—68)

This invention relates to a novel method and apparatus for the continuous crystallization of aluminum from liquid amalgams of aluminum and mercury. More particularly, the invention concerns a process and apparatus whereby aluminum is recovered from a stationary body of liquid amalgam which is surrounded by a liquid zone of substantially lower aluminum concentration so that crystallization of aluminum takes place substantially wholly withing said central body of amalgam.

It is known to extract aluminum from materials in which it is available in metallic form by means of hot liquid mercury at temperatures between about 500° C. and about 600° C., forming an amalgam with the aluminum. The major portion of the insoluble residue is separated from the amalgam, and the aluminum is recovered from the amalgam by distillation of the mercury or by cooling of the amalgam and precipitation and crystallization of aluminum, followed by melting the aluminum and distilling the residual mercury. The present invention deals with recovery of the aluminum by crystallization, from its solution in mercury.

The crystallization of aluminum from amalgams, as proposed in the prior art, may be carried out, for example, either in horizontal or vertical crystallizers. Conventionally, the hot amalgam, which may contain between about 0.5% and about 30% by weight of aluminum in solution, is transferred from the extraction apparatus to the crystallizer. In the crystallizer vessel, the temperature of the amalgam is lowered while aluminum crystals nucleate and grow simultaneously, in accordance with well known phase relationships of solubility and temperature in the system aluminum-mercury. In order to bring about crystallization, both the tangible heat and the heat of solidification must be withdrawn, preferably through the surrounding wall of the crystallizer. However, provision can be made to insert heat exchange elements within the apparatus. In either case, the aluminum crystals begin to nucleate and to grow on the inner walls of the crystallizer, through which the temperature gradient is manifested. This tendency for aluminum to adhere to the walls of the crystallizer is attributable to the fact that pure aluminum, with no oxide film, is extremely prone to stick to metallic containers and to adhere to itself. Not all the aluminum crystals rise to the surface of the liquid amalgam despite the lower specific weight of the aluminum crystals. Thus, prolonged growth of such aluminum crystals eventually brings about plugging of the entire crystallizer vessel, thereby rendering continuous operation of the crystallizer impossible.

In U.S. Patent 2,707,678, recognition is given to the fact that a vertical crystallizer is clogged by precipitated aluminum crystals after a short time, and that the deposit cannot readily be removed by mechanical means. Hence this patent proposes to employ a horizontal crystallizer, cooling the surface of the vessel, and loosening the aluminum crystals deposited on the walls by means of a cutting worm. However, no provision is made to remove crystals adhering to the cutting worm, which may still impede operation. There are other disadvantages, such as seepage of mercury along the axle of the cutting worm owing to pressure inside the vessel, and the necessity of resharpening the worm periodically.

In U.S. Patent 3,102,805, it is proposed to inject hot aluminum amalgam into the interior of a body of colder mercury in a direction away from the walls of a vertical container to minimize caking of aluminum crystals on the walls of the vessel. This method has two disadvantages, however. The first is that the adherence of aluminum crystals to the crystallizer wall is only reduced but not eliminated. The second is that a hot amalgam when injected into a body of colder mercury precipitates very small aluminum crystals which cannot grow during the normally short residence time, to a size large enough to be successfully separated subsequently from the mercury. The resulting mixture of fine aluminum crystals and mercury has the consistency of a pudding. Those small crystals which do adhere to the crystallizer wall and thus remain over longer time periods, such as days and weeks, grow to larger and larger sizes. Finally, they too impede continuous operation of the crystallizer.

In accordance with the present invention, there is provided a novel method and apparatus for crystallization of aluminum from its amalgams or solutions in mercury which overcomes the drawbacks of prior art methods and apparatus. The method and apparatus of the invention are based upon the principle of employing a vertical type crystallizer and of conducting the crystallization in such manner that nucleation of aluminum crystals on the vertical walls of the crystallizer is avoided. This is accomplished, in accordance with the invention, by providing and maintaining a zone of a liquid layer of mercury which includes a low concentration of aluminum amalgam, surrounding a substantially stationary body of liquid aluminum amalgam and aluminum crystals, said surrounding zone having a substantially lower aluminum concentration than prevails in the center portion of the stationary body of amalgam.

In this way, in accordance with the novel method of the invention, nucleation and crystal growth of the aluminum crystals occurs primarily within the center portion of the main body of amalgam. The surrounding zone provides and maintains a liquid low concentration amalgam within a confined space immediately adjacent the inner walls of the crystallizer, in which the concentration of amalgam is always kept below the saturation concentration of aluminum in mercury at any temperature above the particular final temperature at which the crystallization of aluminum from the main body of amalgam is completed. In this way, nucleation and growth of aluminum crystals within this peripheral zone or onto the walls of the crystallizer is prevented. At the same time, cooling of the main, or interior, body of amalgam of higher concentration continues to take place in the desired manner, namely by thermal conduction through the main body of liquid amalgam and ultimately through the walls of the crystallizing vessel.

While the foregoing principles may be carried out in accordance with a wide range of specific conditions, the preferred practice of the invention involves maintaining a substantially stationary main body of a mixture of liquid mercury or aluminum-mercury amalgam, and solid aluminum, into which concentrated hot fresh amalgam is continuously introduced, preferably at or near the bottom, and within which main body, crystallizationof aluminum takes place. Where a vertical type crystallizer is employed, such main body will take the form of a vertical column.

The temperature of the stationary body of amalgam is advantageously maintained at between about 200° and about 300° C., the selection of temperature and correlated residence time being such that aluminum crystals are formed and grown which are large enough to float to the upper surface of the column easily, with the avoidance of the formation of pudding-like mixtures of mercury and very fine aluminum crystals, which would tend to remain suspended for impractical periods of time. Thus, for example, a temperature of 200° C. would involve a residence time of about 20 to 30 minutes, while a temperature of 300° C. would involve a residence time of 10 to 15 minutes.

Concentrated hot amalgam from the extraction process is continuously introduced, preferably in a vertical direction, into the lower portion of the amalgam column, and spent amalgam is continuously removed from the upper portion. The spent amalgam may contain between about 0.06% and 0.4% by weight of aluminum if removed at temperatures between about 200° C. and 360° C. It may also be cooled to a lower, say ambient temperature after removal from the crystallizer vessel. In such a case and after filtering additionally crystallized aluminum from the amalgam, the remaining liquid may contain still less aluminum in solution, e.g., about 0.002% by weight at 20° C. The solubility of aluminum in mercury is approximately 0.002% by weight at 20° C. and about 0.4% at the boiling temperature of mercury which is about 360° C. The aluminum amalgam which comes from the extraction step and which is introduced into the main body of amalgam in the crystallization step will ordinarily, depending upon its temperature, contain between about 0.5% and about 20% by weight of aluminum.

In accordance with the novel method of the invention, there is maintained during the crystallization step, and surrounding the main body of amalgam in which crystallization takes place, a peripheral zone of liquid mercury or of a liquid amalgam of aluminum and mercury which contains a lower concentration than that which prevails at the center of said main body. In accordance with one embodiment of the invention, said peripheral zone is composed of pure or substantially pure mercury. In accordance with a preferred embodiment, the peripheral zone is made up of spent amalgam withdrawn from the upper portion of the main body of amalgam, and which contains a low concentration of aluminum. The mercury or amalgam forming the peripheral zone is preferably at a temperature between about 150° C. and about 300° C. as it is introduced. It should contain between about 0.001% and about 0.4% by weight of aluminum. The temperature of the peripheral zone itself may vary somewhat more widely, namely between about 20° C. and 360° C. depending upon operating conditions in the main crystallization body.

Under these conditions, heat is transferred substantially by conduction from the interior of the main amalgam column through the peripheral zone and towards the crystallizer wall, where it is dissipated by air cooling or by positive external cooling means. Some cooling effect may also be obtained by introducing the peripheral zone liquid at a temperature lower than that of the main column, thus promoting heat exchange between the two liquid bodies. Nucleation and crystal growth of the aluminum occurs substantially only in the core zone, and the resulting aluminum crystals, which are dynamically forced away from the vessel wall, float freely upward, growing while rising owing to continuous precipitation of aluminum as the crystals float upward through progressively lower temperature zones.

The principles and practice of the invention will be better understood by reference to the accompanying drawings in which there are shown present preferred embodiments of the invention, for purposes of illustration only, and not of limitation. In the drawings.

Figures 1, 2, 3:
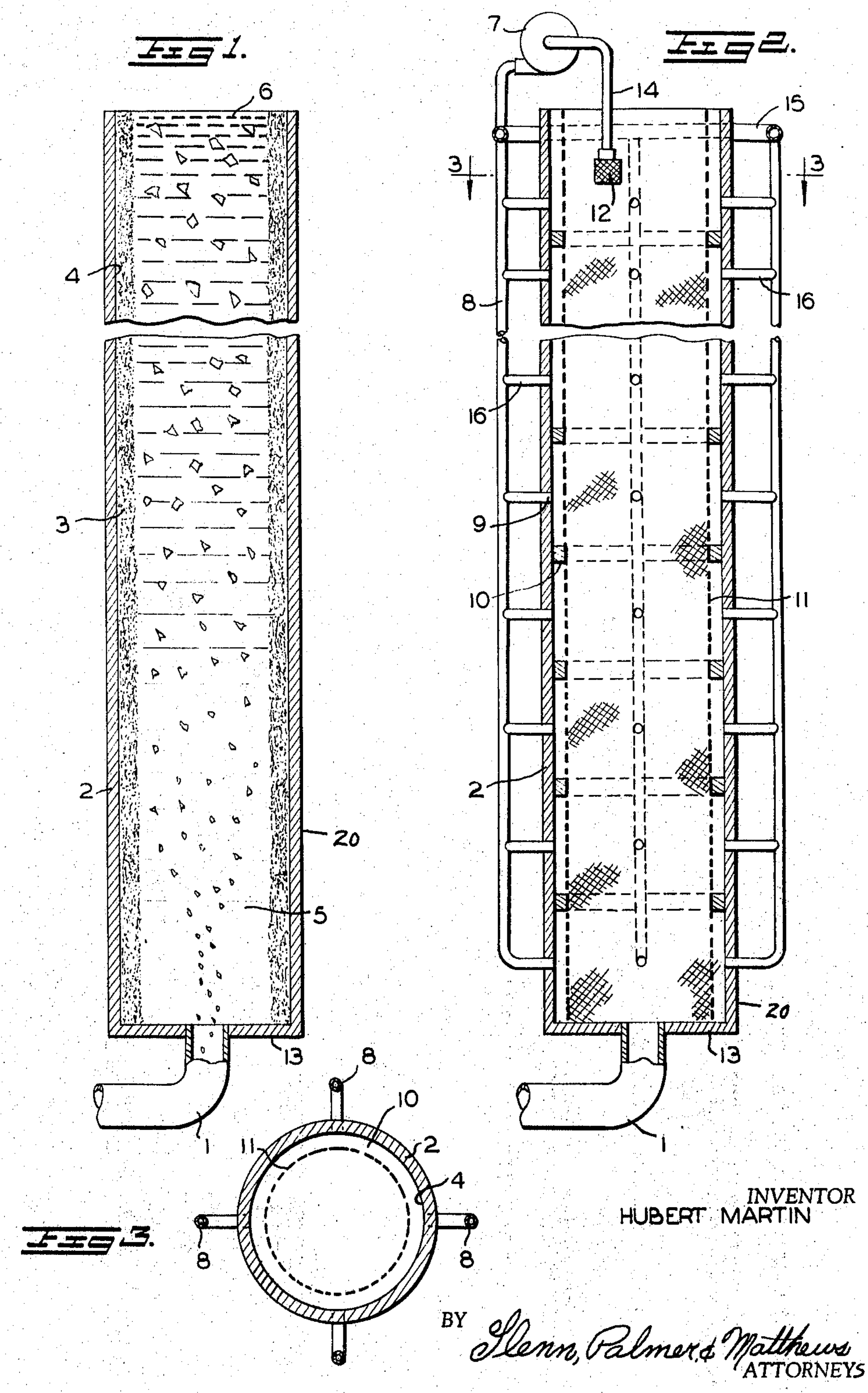
FIGURE 1 is a view in cross-section of the body of crystallizing amalgam surrounded by the peripheral zone of lower concentration amalgam, within the crystallizer.
FIGURE 2 is a schematic cross-sectional elevation of one form of the crystallizing apparatus of the invention.
FIGURE 3 is a plan view of the crystallization apparatus, taken along the line 3—3 of FIGURE 2.

The principle of operation of the method and apparatus of the invention is illustrated in FIGURE 1, wherein 2 represents the shell of the crystallizer 20, which may be of any desired configuration. The shell 2 is vertically disposed, and may be cylindrical, i.e. circular in cross-section, or may be rectangular in cross-section. It may be made of a metal resistant to attack by the hot mercury or aluminum, such as steel or stainless steel. The shell 2 is provided with an inlet pipe 1 which enters through shell bottom 13. Within the shell 2, as illustrated in FIGURE 1, there is maintained a central or core body of hot aluminum amalgam 5, onto which there is continuously introduced fresh hot liquid amalgam via inlet pipe 1. The continuously supplied amalgam is at a temperature above the boiling point of mercury, and contains in liquid solution, depending upon its temperature, between about 0.5 and about 20% of aluminum by weight. As cooling of the high concentrated core amalgam occurs, aluminum crystals nucleate and float toward the top of the column of amalgam. The concentration of the liquid amalgam decreases correspondingly in the upper portions 6 of the system.

A peripheral zone 3 of lower concentration amalgam is maintained adjacent the inside wall 4 of the shell 2, thereby preventing harmful nucleation and accumulation of aluminum crystals on the shell wall, as explained previously.

A presently preferred form of the crystallization apparatus is shown in FIGURE 2. The apparatus comprises vertically disposed shell 2, which is provided with means 1 for introducing liquid amalgam into the bottom portion thereof. The shell 2 is provided at its upper portion with pump means 7 for removal of spent amalgam via outlet pipe 14 which is fitted at its intake end with filter 12. The filter 12 prevents aluminum crystals from entering the pump system.

The shell 2 is provided around its periphery with a plurality of distributing pipes 8 which are supplied by pump 7 via a manifold 15. The distributing pipes 8 are connected to the interior wall of shell 2 by a plurality of inlet conduits 16, whereby liquid is introduced into the interior of the shell 2 at openings 9 in the shell wall, at numerous locations over the wall surface. This piping system provides means for the circulation to the crystallizer shell of all or a portion of the spent amalgam of low concentration removed from the upper portion of the crystallizer by pump 7. At spaced intervals there are provided on the inner wall of shell 2, and extending inwardly therefrom, a plurality of ring-like separators 10 which serve to support a screen cylinder 11 which is attached to said separators. The separators and the screen are advantageously made of stainless steel. Thus screen 11 may be made of 14 to 325 U.S. standard mesh stainless steel. The screen 11 serves to maintain and uniformly distribute the low concentration peripheral zone of amalgam which surrounds the central amalgam core. The pressure of the peripheral zone amalgam is adjusted so as to insure flow through the screen and to provide a film of lower concentration on both sides of the screen, preventing the screen surface from becoming a nucleation site. FIGURE 3 shows screen 11 in place and spaced away from the shell wall 4.

The practice of the method of the invention and the operation of the apparatus are illustrated by the following example, which is not, however, to be considered as limiting:

*Example*

Crystallizer shell 2 is filled with a stationary core body of liquid amalgam and aluminum crystals. The temperature in the upper portion of the vessel is maintained at approximately 300° C., at which temperature the solubility of aluminum in mercury is reduced to about 0.17%. The level of the liquid within the vessel stands approximately 40 feet from the bottom, thus providing a sufficient pressure to counteract the vapor pressure of fresh amalgam introduced at the bottom of the shell. Fresh amalgam from the extraction operation, comprising a 3% aluminum—97% mercury solution, is introduced into the crystallizer vessel from pipe 1, at a temperature of 550° C. The size of the vessel is determined by the amount of high concentration amalgam supplied, the residence time needed to complete coarse crystallization of the aluminum, and the volume of low concentration amalgam needed to form and maintain the peripheral zone 3.

The crystallizer shell 2 was circular in cross-section and had an inside diameter of 10 inches. The concentrated amalgam was fed into the shell at a rate of about 20 liters per minute. Low concentration liquid amalgam, 0.17% aluminum, was withdrawn from the top of the vessel and pumped via pump 7 through pipe system 8, while maintaining its temperature at about 250° C. to 300° C. before introducing it into the crystallizer via inlet pipes 9. The number of such inlet pipes 9 numbered 200, which were spaced evenly over the entire vessel wall.

A portion of the spent amalgam, about 11 liters per minute, was returned to the crystallizer. In order to maintain a confined peripheral zone 3 of low aluminum concentration within the vessel, a stainless screen cylinder having a 9 inch diameter and of 200 mesh size, was disposed concentrically within the shell, supported by members 10, and spaced away from the wall, as shown in FIGURE 3. The crystallizer was thus operated continuously, there being no moving parts other than the pumps, and with no deposit of aluminum taking place on the vessel walls. The aluminum crystals formed in the main body of amalgam are removed from the upper portion of the apparatus by any suitable mechanical means, not shown.

What is claimed is:

1. Method for the crystallization of aluminum from a liquid amalgam of aluminum and mercury which comprises the steps of providing a body of liquid aluminum-mercury amalgam, maintaining said body substantially quiescent and in contact with a surrounding periphereal zone of a liquid layer of mercury containing a substantially lower aluminum concentration than that prevailing in the center of said body, introducing hot aluminum-mercury amalgam into the lower portion of said quiescent body, crystallizing aluminum crystals wholly within said quiescent body, allowing said aluminum crystals to rise to the top of said body and removing them thereform, and removing spent liquid amalgam from the upper portion of said quiescent body.

2. The method of claim 1 in which the concentration of aluminum in said peripheral layer is below the saturation concentration of aluminum in mercury at the crystallization temperature in the center portion of said quiescent body.

3. The method of claim 1 in which the temperature of said quiescent body is between about 200° C. and about 300° C.

4. The method of claim 1 in which the temperature of said peripheral layer is between about 150° C. and about 300° C.

5. The method of claim 1 in which the concentration of aluminum in said peripheral layer is less than about 0.4% by weight.

6. The method of claim 1 in which the concentration of aluminum in said quiescent body is between about 0.5% and 20% by weight.

7. The method of claim 1 in which the peripheral zone is composed of substantially pure mercury.

8. The method of claim 1 in which the peripheral zone is composed of spent amalgam from said quiescent body.

9. The method of claim 1 in which the hot amalgam is supplied to said quiescent body at a temperature of about 550° C.

10. The method of claim 1 in which the hot amalgam supplied to said quiescent body contains about 3% aluminum by weight.

11. The method of claim 1 in which the quiescent body of amalgam has a depth sufficient to counteract the vapor pressure of the mercury of the hot amalgam introduced into the lower portion of said body.

12. Method for the continuous crystallization of aluminum from a liquid amalgam of aluminum and mercury which comprises the steps of providing a body of liquid aluminum-mercury amalgam, maintaining said body substantially quiescent and in contact with a surrounding peripheral zone of a liquid layer of mercury containing a substantially lower aluminum concentration than that prevailing in the center of said body, continuously introducing hot aluminum-mercury amalgam into the lower portion of said quiescent body, crystallizing aluminum crystals wholly within said quiescent body, allowing said aluminum crystals to rise to the top of said body and removing them continuously therefrom, removing spent liquid amalgam low in aluminum from the upper portion of said body and supplying at least a portion thereof to said peripheral zone.

References Cited by the Examiner

UNITED STATES PATENTS

| | | | |
|---|---|---|---|
| 2,550,502 | 4/1951 | Sittner | 266—37 |
| 2,666,304 | 1/1954 | Ahrel | 62—58 |
| 2,707,678 | 5/1955 | Messner | 75—68 |
| 2,718,389 | 9/1955 | Perrin | 266—37 |
| 2,977,234 | 3/1961 | Wenzelberger. | |
| 3,102,805 | 9/1963 | Messner | 75—68 |

DAVID L. RECK, *Primary Examiner.*

HYLAND BIZOT, *Examiner.*

H. W. TARRING, *Assistant Examiner.*